(12) United States Patent
Matsunaga et al.

(10) Patent No.: US 8,346,948 B2
(45) Date of Patent: Jan. 1, 2013

(54) INFORMATION PROCESSING APPARATUS, SELECTOR, REMOTE OPERATION SYSTEM, SCAN CODE TRANSMISSION METHOD, AND PROGRAM PRODUCT THEREFOR

(75) Inventors: Akihiro Matsunaga, Shinagawa (JP); Kenichi Fujita, Shinagawa (JP); Shinichi Katayama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 13/181,088

(22) Filed: Jul. 12, 2011

(65) Prior Publication Data

US 2011/0270961 A1 Nov. 3, 2011

Related U.S. Application Data

(62) Division of application No. 11/503,166, filed on Aug. 14, 2006, now Pat. No. 8,001,173.

(30) Foreign Application Priority Data

Aug. 15, 2005 (JP) ................................. 2005-235216

(51) Int. Cl.
*G06F 15/16* (2006.01)
(52) U.S. Cl. ........................................ 709/228; 709/246
(58) Field of Classification Search .................. 709/220, 709/223–224, 238, 246
See application file for complete search history.

(56) References Cited

U.S. PATENT DOCUMENTS

| | | | |
|---|---|---|---|
| 5,786,809 A | 7/1998 | Ryzhov | |
| 5,844,547 A | 12/1998 | Minakuchi | |
| 5,905,914 A | 5/1999 | Sakai | |
| 6,081,266 A | 6/2000 | Sciammarella | |
| 6,282,418 B1 * | 8/2001 | Wellmann | 455/433 |
| 6,326,953 B1 | 12/2001 | Wana | |
| 6,429,793 B1 | 8/2002 | Paolini | |
| 6,456,277 B1 * | 9/2002 | Satoh et al. | 345/168 |
| 6,492,961 B1 | 12/2002 | Fukatsu | |
| 6,686,904 B1 | 2/2004 | Sherman | |
| 2002/0071421 A1 | 6/2002 | Chiu et al. | |
| 2003/0065864 A1 | 4/2003 | Hollinger | |

FOREIGN PATENT DOCUMENTS

| | | |
|---|---|---|
| JP | 6289971 | 10/1994 |
| JP | 11134098 | 5/1999 |
| JP | 2000250696 | 9/2000 |

OTHER PUBLICATIONS

Restriction Requirement for co-pending U.S. Appl. No. 11/503,166 mailed Sep. 27, 2010.
Office Action for co-pending U.S. Appl. No. 11/503,166 mailed Nov. 30, 2010.
Notice of Allowance for co-pending U.S. Appl. No. 11/503,166 mailed Apr. 14, 2011.
U.S. Appl. No. 11/503,166, filed Aug. 14, 2006, Akihiro Matsunaga et al., Fujitsu Component Limited.

* cited by examiner

*Primary Examiner* — Patrice Winder
(74) *Attorney, Agent, or Firm* — Staas & Halsey LLP

(57) ABSTRACT

An information processing apparatus includes a code converting portion that converts a scan code output from a keyboard into a corresponding key code, a data converting portion that converts the key code into packets, and a changing portion that changes an output destination of the scan code from the code converting portion to the data converting portion, when an application software to operate a server apparatus remotely located is activated in the information processing apparatus, which is in connection with the server apparatus over a network.

4 Claims, 16 Drawing Sheets

| IDENTIFICATION DATA | DATA ID (1 BYTE) | DATA LENGTH (2 BYTE) | ACTUAL DATA |

INFORMATION PROCESSING APPARATUS, SELECTOR, REMOTE OPERATION SYSTEM, SCAN CODE TRANSMISSION METHOD, AND PROGRAM PRODUCT THEREFOR

CROSS-REFERENCE TO RELATED APPLICATIONS

This application is a U.S. divisional application filed under 37 USC 1.53(b) claiming priority benefit of U.S. Ser. No. 11/503,166 filed in the United States on Aug. 14, 2006 now U.S. Pat. No. 8,001,173, which claims earlier priority benefit to Japanese Patent Application No. 2005-235216 filed with the Japanese Intellectual Property Office on Aug. 15, 2005, the disclosures of which are incorporated herein by reference.

BACKGROUND OF THE INVENTION

1. Field of the Invention

This invention generally relates to a technique of operating multiple servers in connection with a network from a Keyboard/Video Mouse (KVM) with the use of a personal computer for control (hereinafter, referred to as control PC).

2. Description of the Related Art

When multiple servers on the network are selectively changed for operation by using a set of input devices (such as a keyboard, pointing device, and the like), a KVM apparatus 200 shown in FIG. 1 is employed. In such a system, data generated by operating a keyboard 110 and a pointing device 111 is converted into packets on a control PC 100 and transmitted on the network of TCP/IP or the like, to a KVM apparatus 200. Upon receiving the packet data, the KVM apparatus 200 acquires data of the keyboard and that of the pointing device from the packet data and delivers to servers (1, 2, 3, . . . , and N). The remote operation is executed by the above-described processing.

The control PC 100 is a general-purpose PC, and data input from the keyboard 110 is processed in a flowchart shown in FIG. 2. Subsequent to the key input on the keyboard 110, the key data is transmitted to the control PC 100. The key data transmitted is called scan code, and has a different data value according to each key. The scan code input from the keyboard 110 is received by an interface processor 107 of the control PC is converted into a key code on a keyboard driver 104, and is output to an Operating System (OS) 102 for code analysis, as shown in FIG. 2. The key code is a predetermined standard code of OS, that is to say, code data that can be recognized and processed by OS. The scan code varies depending on the keyboard. An example is "@", which is different between US101 keyboard and OADG109 keyboard. Therefore, a conversion process is carried out to correct the difference, and is passed onto the OS 102 as a key code.

The key code received on the OS 102 is transmitted to a data detection module 101, which is enacted by application software. The key code received on the data detection module 101 is output to a data converter 105, and is converted into packets thereon. Then the packets are output to a communication processor 108, and are transmitted onto the network from the communication processor 108.

Japanese Patent Application Publication No. 6-289971 (hereinafter, referred to as Document 1) discloses a system in which a key input generated by the keyboard operation of a server apparatus is converted into a key code to transmit to a client apparatus. The client apparatus stores display key information tables for multiple server apparatuses, in which the key code used on the client apparatus is associated with the key code used on the server apparatus. The above-described system is also equipped with a display key library, which refers to the corresponding display key information table, and converts the key code input from the server apparatus into the key code used on the client apparatus.

Japanese Patent Application Publication No. 2000-250696 (hereinafter, referred to as Document 2) relates to a remote control in which one control information terminal remotely controls another information terminal to be controlled among the information terminals connected over the network. When the control information terminal and the information terminal to be controlled have different physical types or different logical layouts in keyboards, the actual scan code generated by the control information terminal is converted into a vertical scan code, and then the vertical scan code is converted into the actual scan code of the keyboard of the information terminal to be controlled.

In the conversion from the scan code into the key code, Left-Shift key and Right-Shift key have the same key codes. In this manner, the scan codes are different in inputting on the keyboard, but are converted into an identical key code.

In a case where the remote server is operated with the application that runs on the control PC 100, the keyboard data is always transmitted through the OS of the control PC 100. For this reason, the server, in some cases, has a system that can operate only the data converted into the key code. In such system, if there is an application that executes different functions by recognizing the difference of the inputs between Left-Shift key and Right-Shift key on the server, there will be a problem that the function cannot be executed due to the inability to recognize the difference between the key inputs on the server.

Also, in all systems, a special key input such as Ctrl-Alt-Delete is recognized by the OS 102 of the control PC 100, so there is no transmission to the server from the control PC 100. Therefore, in order to transmit such special key to the remote server from the control PC 100 in the system equipped with the KVM apparatus 200, the application is designed to include GUI of special key buttons so that the GUI buttons are clicked by a mouse to produce special key data (an example is DSR series (product name) of Avocent). However, in this method, all the key inputs cannot be executed over the keyboard and it is inconvenient for users.

In addition, according to both techniques disclosed by Document 1 and Document 2, there are provided a conversion table to convert the key code or scan code generated on one terminal into those usable on another terminal. Such techniques consume resources of the apparatus for the conversion, and cause other problems that the conversion needs time and another driver software needs to be installed.

SUMMARY OF THE INVENTION

The present invention has been made in view of the above circumstances and provides an information processing apparatus, server selector, remote operation system, scan code transmission method, and program product therefor, in which a key input on a keyboard can be effectively recognized by a server.

According to one aspect of the present invention, preferably, there is provided an information processing apparatus including: a code converting portion that converts a scan code output from a keyboard into a corresponding key code; a data converting portion that converts the key code into packets; and a changing portion that changes an output destination of the scan code from the code converting portion to the data converting portion, when an application software to operate a server apparatus remotely located is activated in the information processing apparatus, which is in connection with the server apparatus over a network. The scan code generated from the keyboard can be transmitted to the server apparatus without change. Accordingly, there is no unnecessary data conversion, and the key input can be recognized by the server. There is no necessity of software install for data conversion, thereby eliminating the resource consumption in the server apparatus and the information processing apparatus. In addition, unnecessary data conversion is not performed, thereby improving the data reliability. A special key such as Ctrl-Alt-Delete or the like can be transmitted to the server. According to another aspect of the present invention, there is provided a server selector including: a storage portion that stores information on a connection specification between one or more server apparatuses and the server selector; a data converter that converts a scan code generated from a keyboard into data corresponding to the connection specification; and a transmitting portion that transmits the data corresponding to the connection specification, to the one or more server apparatuses, wherein the server selector can operate the one or more server apparatuses with a set of console. The server selector is provided with a function of converting into the data according to the connection specification to operate one or more server apparatuses. Accordingly, there is no need for installing the software for data conversion on the server apparatus, thereby eliminating the resource consumption of the server apparatus. The scan code generated from the keyboard is converted into the data corresponding to the connection specification and transmitted to the server apparatus. This does not cause the problem that the scan code cannot be recognized on the server apparatus.

According to another aspect of the present invention, there is provided a remote operation system including: multiple server apparatuses remotely located; a server selector in connection with the multiple servers over a network to be able to operate the multiple server apparatuses with a set of console; and an information processing apparatus in connection with the server selector and having the set of console to operate the multiple server apparatuses, the information processing apparatus including: a storage portion that stores information on a connection specification between each of the multiple server apparatuses and the server selector; a data converting portion that converts a scan code generated from a keyboard into data corresponding to the connection specification of one of the multiple server apparatuses, which is a transmission destination of the scan code; and a transmitting portion that transmits the data corresponding to the connection specification to the server selector.

According to another aspect of the present invention, there is provided a scan code transmission method including: converting a scan code input on a keyboard into packets without changing to a corresponding key code, when an application software to operate a server apparatus is activated; and transmitting the scan code converted into the packets to a server apparatus remotely located and connected over a network.

According to another aspect of the present invention, there is provided a scan code transmitting method including: converting a scan code input with a set of console into data corresponding to a connection specification with a server apparatus selected from multiple server apparatuses; transmitting the data corresponding to the connection specification to the server apparatus.

According to another aspect of the present invention, there is provided a computer readable medium storing a program causing a computer to execute a process for a scan code transmission, the process including: converting a scan code input on a keyboard into packets without changing to a corresponding key code, when an application software to operate a server apparatus is activated; and transmitting the scan code converted into the packets to a server apparatus remotely located and connected over a network.

According to another aspect of the present invention, there is provided a computer readable medium storing a program causing a computer to execute a process for a scan code transmission, the process including: converting a scan code input with a set of console into data corresponding to a connection specification with a server apparatus selected from multiple server apparatuses; transmitting the data corresponding to the connection specification to the server apparatus.

BRIEF DESCRIPTION OF THE DRAWINGS

Preferred exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

First Exemplary Embodiment

Figure 1:
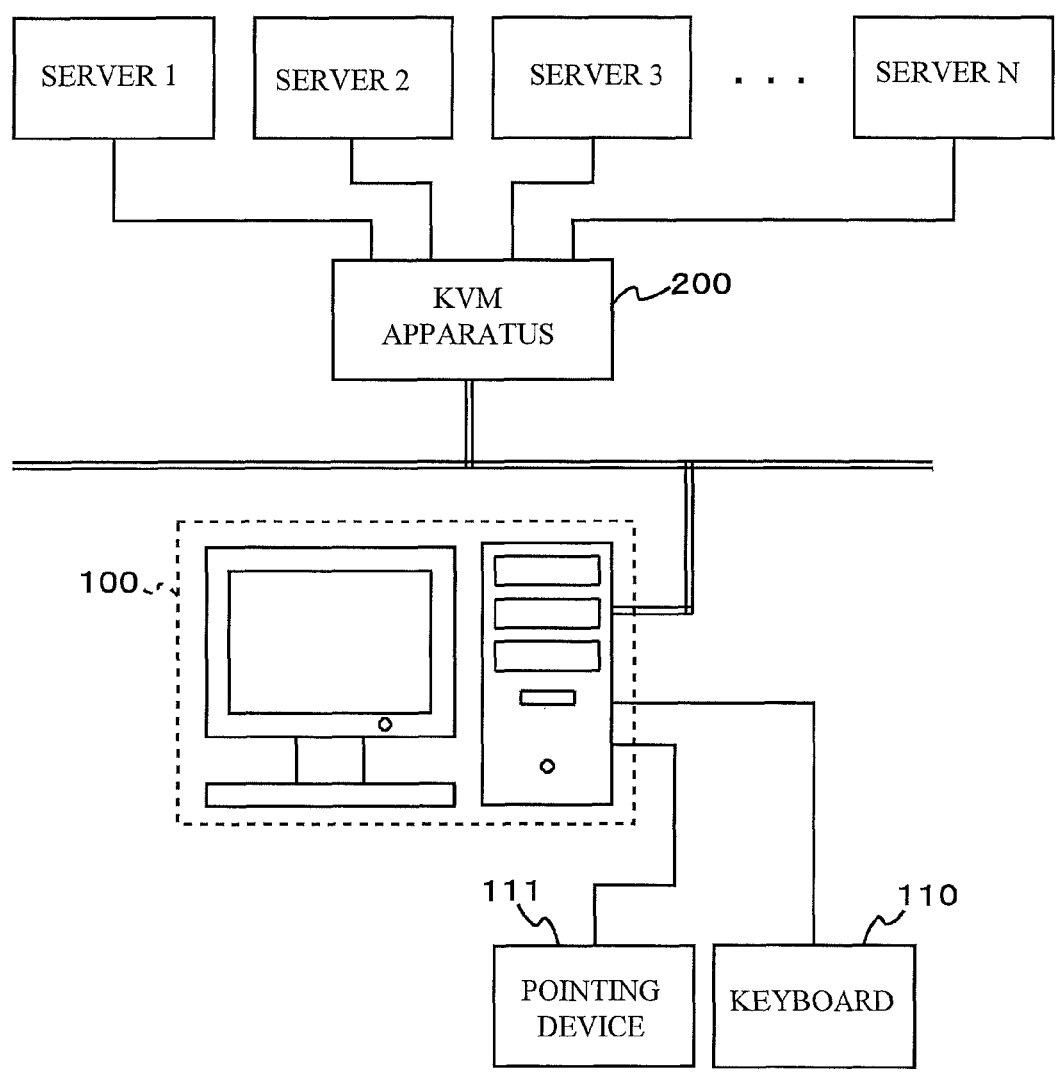
FIG. 1 shows a system configuration.
Figure 2:
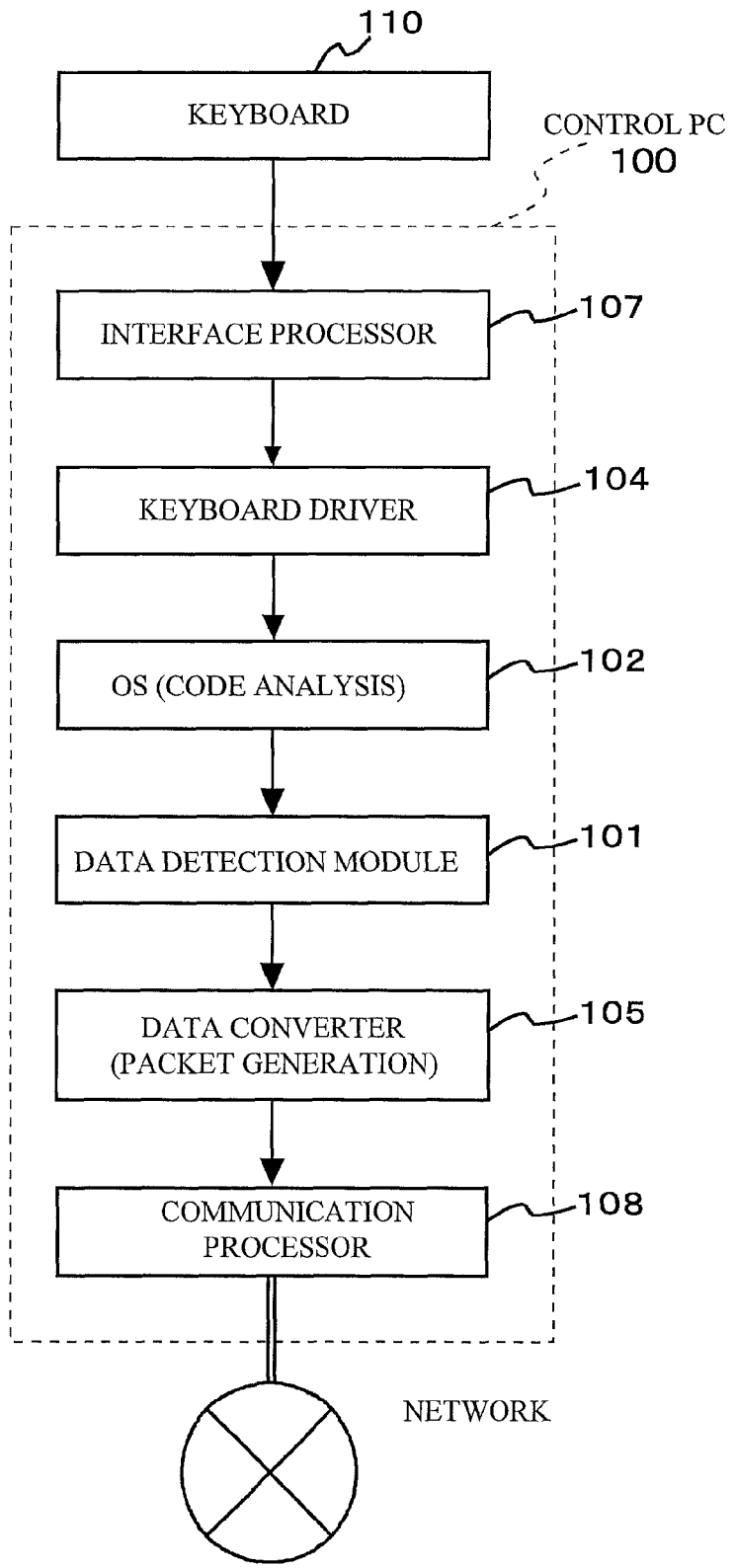
FIG. 2 shows a data flowchart in a control PC.

A description will now be given of a system configuration employed in a first exemplary embodiment, with reference to FIG. 1. There are provided: the control PC 100 (information processing apparatus) having the keyboard 110 and the pointing device 111 serving as a console; the KVM apparatus 200 (server selector) in connection with the control PC 100; and multiple servers 1, 2, 3, . . . , N (N is an arbitrary natural number), in connection with a network via the KVM apparatus 200.

Figure 3:
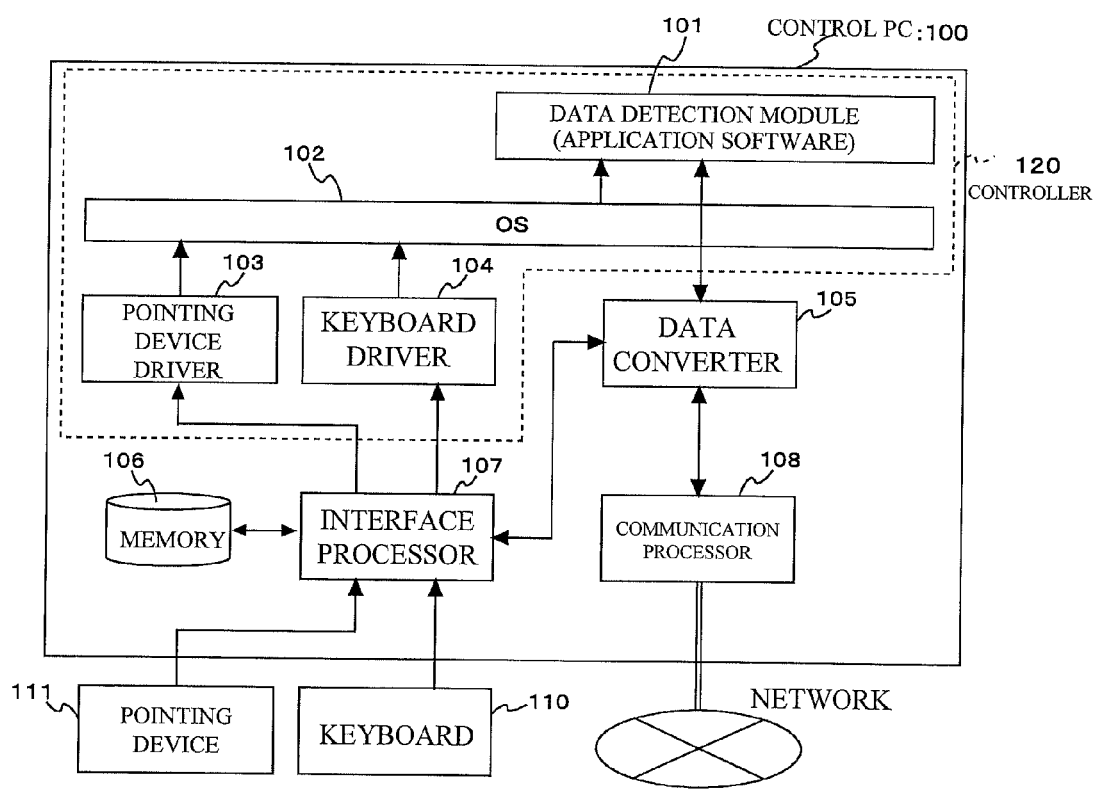
FIG. 3 shows a configuration of the control PC in accordance with a first exemplary embodiment of the present invention.

Referring now to FIG. 3, a description will be given of a configuration of the control PC 100. The control PC 100 includes: a controller 120; a data converter 105 (data converting portion); a memory 106; an interface processor 107; a communication processor 108; and the like. The controller 120 is equipped with: a ROM that stores a control program; a CPU serving as a processing device; a RAM used as a work area of CPU; and the like. A data detection module (application software) 101, an Operating System (OS) 102, a pointing device driver 103, and a keyboard driver 104 shown in FIG. 3 are realized by executing the operation on CPU, according to the program read from the ROM. Also, the control PC 100 is connected by the keyboard 110 and the pointing device 111 via the interface processor 107, and the communication processor 108 is connected to the network.

The data detection module 101 is a part of the functions of the application software, and transmits instruction data to the data converter 105. The instruction data is flag information that instructs the data converter 105 to transmit the received scan code, when the interface processor 107 receives the scan code. The data detection module 101 transmits the pointing device data received from the OS 102 to the data converter 105. In addition, the data detection module 101 transmits the network transmission information to the data converter 105. The network transmission information is configuration information that the communication processor 108 transmits the packet data to the KVM apparatus 200.

Upon receiving the instruction data from the data detection module 101, the data converter 105 outputs the received instruction data to the interface processor 107. In addition, upon receiving the network transmission information from the data detection module 101, the data converter 105 outputs the received information to the communication processor 108. Further, upon receiving the scan code from the interface processor 107, the data converter 105 converts the received scan code into packets and outputs the packets to the communication processor 108. Upon receiving the pointing device data from the data detection module 101, the data converter 105 converts the received scan code into packets and outputs the packets to the communication processor 108.

The interface processor (changing portion) 107 receives the instruction data from the data converter 105, and stores the data in the memory 106. Upon receiving the scan code from the keyboard 110, the interface processor 107 refers to the memory 106 and transmits the scan code according to the instruction data.

"0" is usually set to the instruction data. If the instruction data is "0", the interface processor 107 transmits the scan code to the keyboard driver 104. The scan code output to the keyboard driver 104 is converted into the key code. If the instruction data "1" is set by the data detection module 101, the interface processor 107 transmits the scan code to the data converter 105. The scan code is converted into packets on the data converter 105 and output from the communication processor 108 onto the network. Accordingly, the scan code is output to the control PC 100 without change.

Upon receiving the pointing device data from the pointing device, the interface processor 107 transmits the received data to the pointing device driver 103.

The scan code is input from the interface processor 107 into the keyboard driver (code converting portion) 104. The keyboard driver 104 converts the scan code into the key code and outputs to the OS 102. The pointing device driver 103 receives the pointing device data from the interface processor 107 and outputs to the OS 102.

The OS 102 receives the pointing device data from the pointing device driver 103 and outputs to the data detection module 101. The OS 102 receives the key code from the keyboard driver 104 and outputs to the key code to the data detection module 101.

The communication processor 108 receives the network transmission information from the data converter 105, and transmits the packet data received from the data converter 105 to the network. The communication processor 108 receives the packet data from the network and outputs the packet data to the data converter 105.

Figure 4:
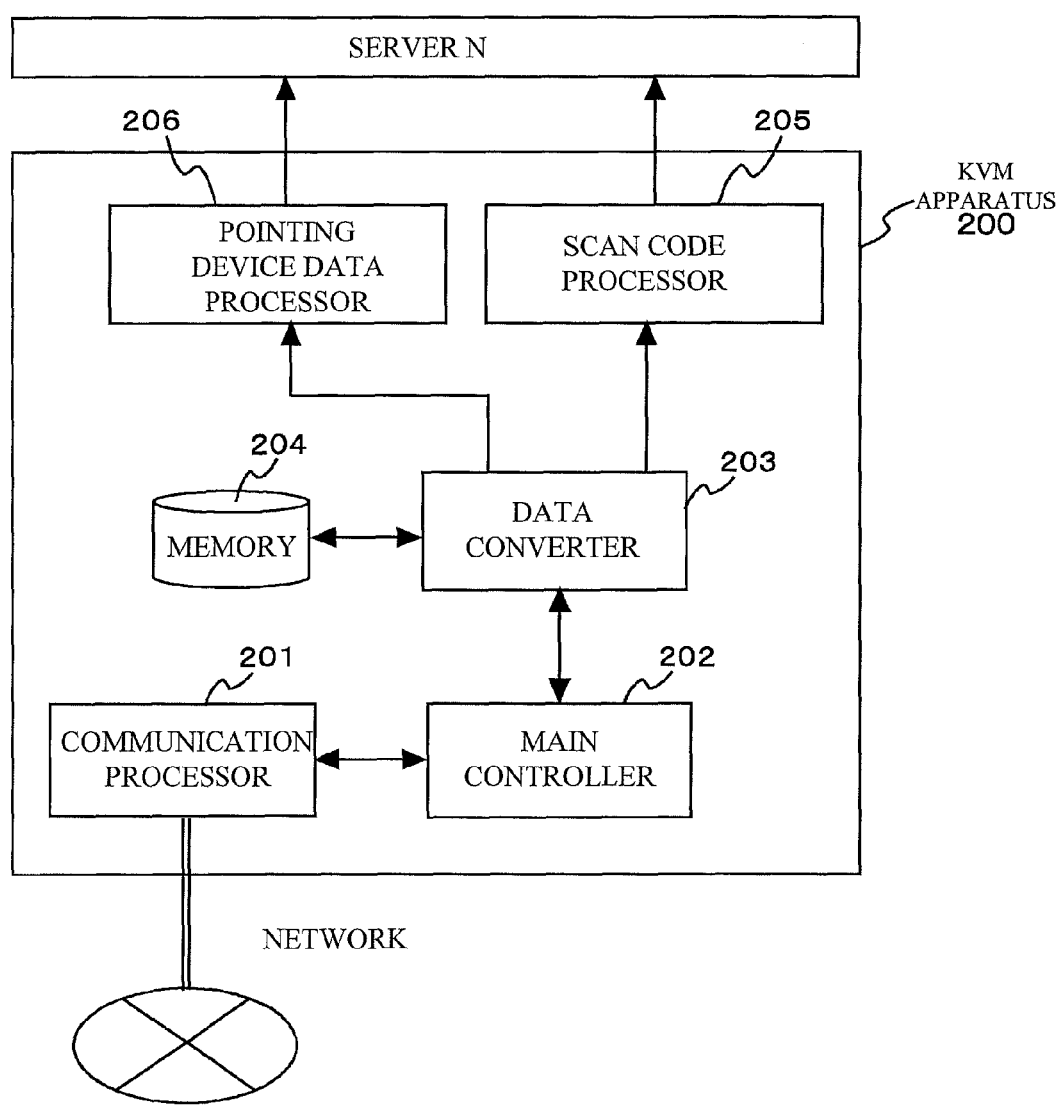
FIG. 4 shows a configuration of a KVM apparatus in accordance with the first exemplary embodiment of the present invention.

A description will now be given of the configuration of the KVM apparatus 200, with reference to FIG. 4. The KVM apparatus 200 includes: a communication processor 201; a main controller 202; a data converter 203; a memory 204 (storage portion); a scan code processor 205; and a pointing device data processor 206.

The communication processor 201 forwards the packet data received via the network to the main controller 202. The packet data forwarded from the main controller 202 is output to the network.

The main controller 202 receives the packet data from the communication processor 201 and outputs the packet data to the data converter 203 (data converting portion). The main controller 202 outputs the data converted into the packet data by the data converted 203 to the communication processor 201.

The data converter 203 receives the packet data from the main controller 202, and retrieves the pointing device data or the scan code from the packet data. Such retrieved scan code data is output to the scan code processor 205, and the pointing device data is output to the pointing device data processor 206.

The scan code processor 205 transmits the scan code input from the data converter 203 to a server N (the server N represents an arbitrary server of the servers 1, 2, 3, . . . , and N). The pointing device data processor 206 transmits the pointing device data input from the data converter 203, to the server N.

Figure 5:
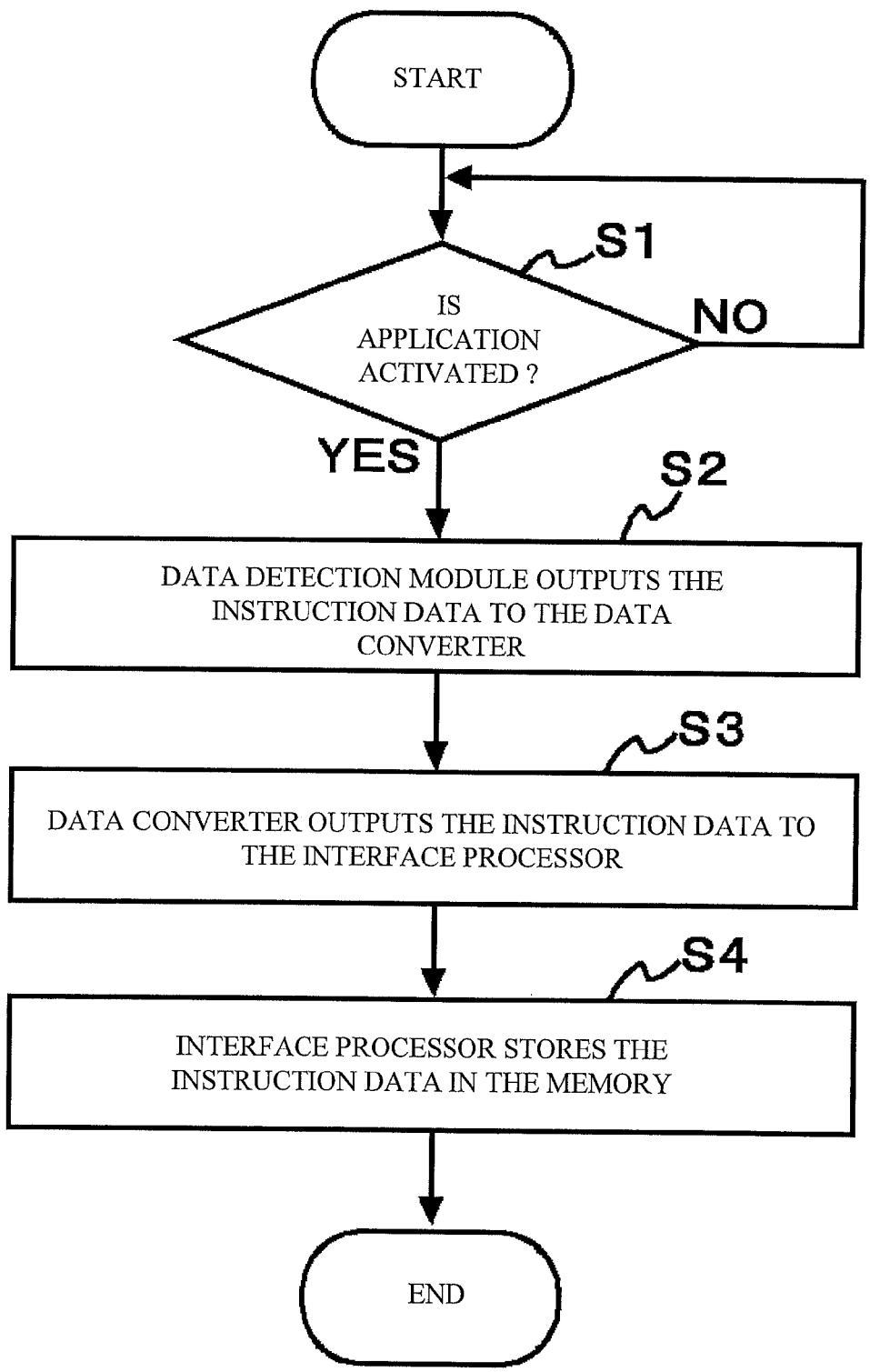
FIG. 5 shows a flowchart to register instruction data in a memory.
Figure 6:
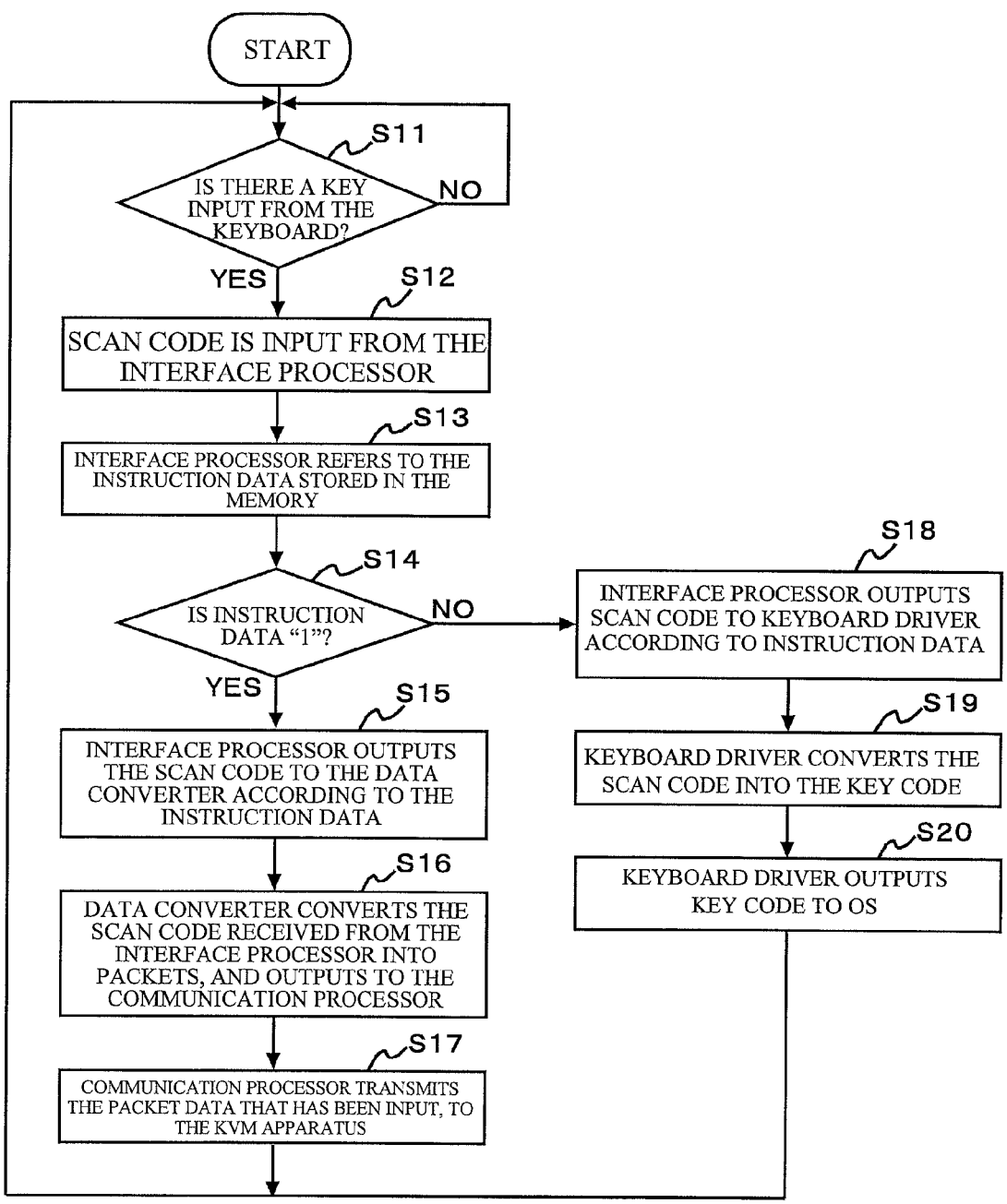
FIG. 6 shows a flowchart of procedure to transmit a scan code to the KVM apparatus according to the instruction data.

Referring now to a flowchart of FIG. 5, a description will now be given of an operation procedure of the control PC 100. When the application that operates the remote server N is activated on the control PC 100 (step S1), the data detection module 101 of the application outputs the instruction data to the data converter 105 (step S2). The data converter 105 outputs the instruction data that has been input is output to the interface processor 107 (step S3). The interface processor 107 stores the input instruction data in the memory 106 (step S4).

Next, a description will be given of an operation when there is a key input on the keyboard 110. When the application is activated to operate the server N, the data detection module 101 outputs the instruction data "1", and the instruction data "1" is set in the memory 106. In this state, when there is a key input from the keyboard 110 (step S11), the scan code is input from the interface processor 107 (step S12). The interface processor 107 refers to the instruction data stored in the memory 106 (step S13), and determines an output destination to which the scan code is output.

Figure 8:
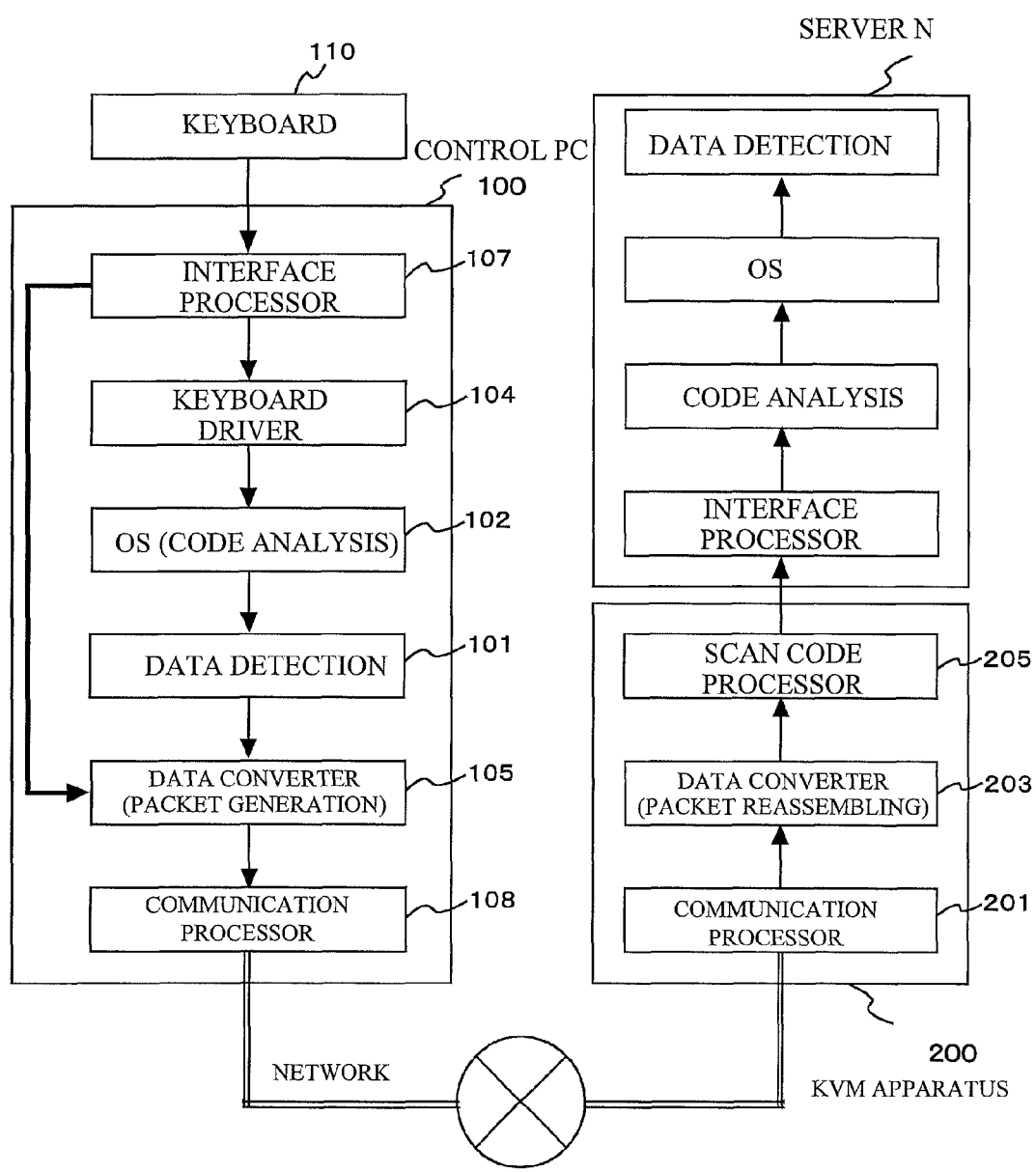
FIG. 8 shows a data flowchart.

If the instruction data is "0" (step S14/NO), the interface processor 107 outputs the scan code to the data converter 105 according to the instruction data as shown in FIG. 8 (step S15). The keyboard driver 104 converts the scan code into the key code (step S19), and outputs the converted key code to the OS 102 (step S20).

If the instruction data is "1" (step S14/YES), the interface processor 107 outputs the scan code to the data converter 105 according to the instruction data as shown in FIG. 8 (step S15). The data converter 105 converts the scan code input from the interface processor 107 into packets, and outputs to the communication processor 108 (step S16). The communication processor 108 transmits the packet data that has been input, to the KVM apparatus 200 (step S17).

When the application that operates the remote server N is completed, the data detection module 101 outputs the instruction data "0". This instruction data is stored in the memory 106 according to the above-described procedure. The instruction data output from the data detection module 101 selectively changes a normal path where the scan code is converted into the key code and a path where the scan code is not converted into the key code.

Figure 7:
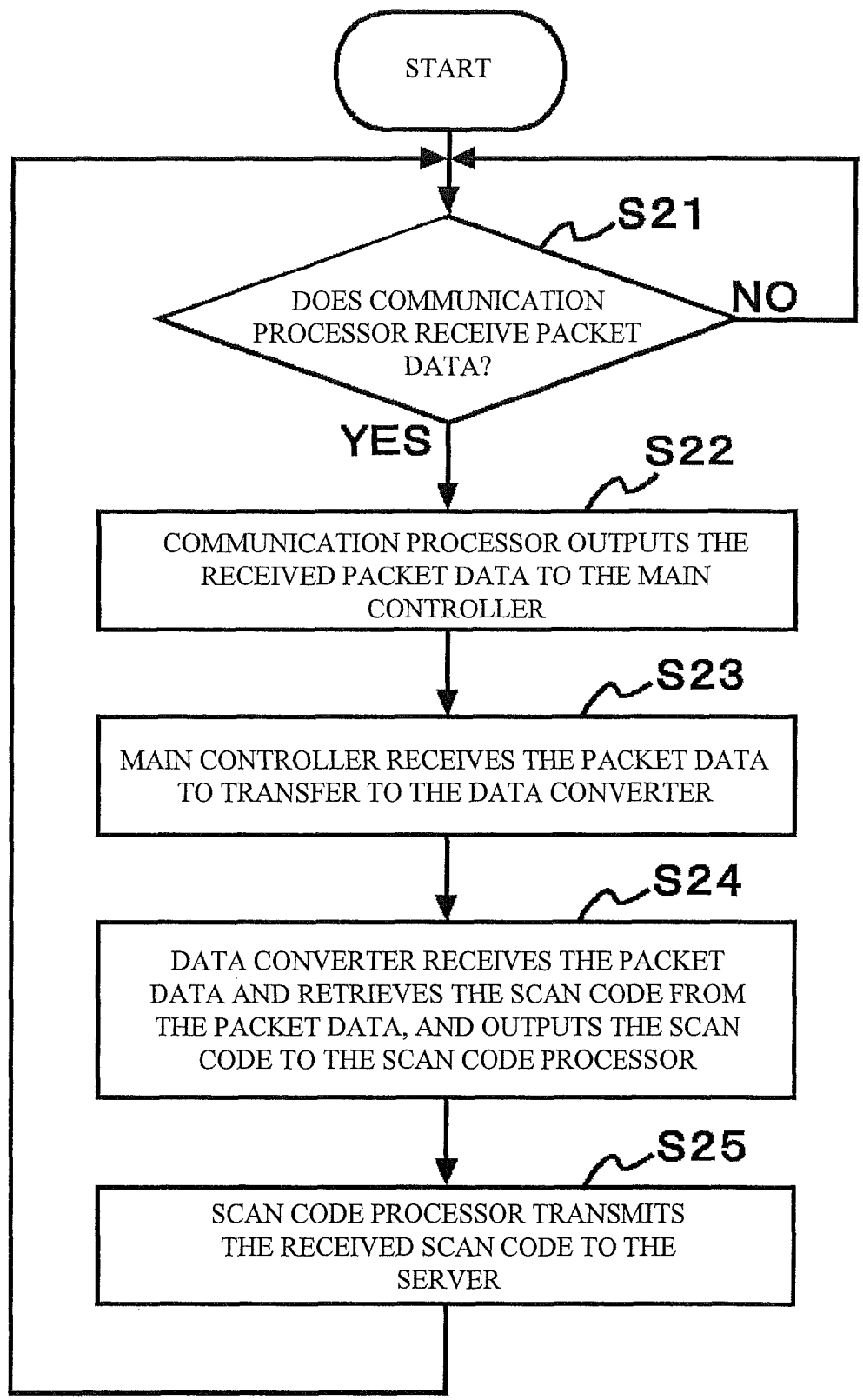
FIG. 7 shows a flowchart of operation at the KVM apparatus.

Referring now to FIG. 7, a description will now be given of an operation procedure of the KVM apparatus 200. The KVM apparatus 200 receives the packet data transmitted from the control PC 100 on the communication processor 201 (step S21/YES). The communication processor 201 outputs the received packet data to the main controller 202 (step S22). The main controller 202 receives the packet data to transfer to the data converter 203 (step S23). The data converter 203 receives the packet data and retrieves the scan code from the packet data (step S24). Such retrieved scan code is forwarded to the scan code processor 205 (step S24). Upon receiving the scan code, the scan code processor 205 transmits the scan code to the server N (step S25).

In the present exemplary embodiment, the scan codes can be directly transmitted to the server N, thereby eliminating the process that the KVM apparatus 200 converts the key code into the scan code again and passes onto the server. Accordingly, the process time can be shortened and the data reliability can be enhanced. Also, when the remote server N is operated, the scan code is directly transmitted to the KVM apparatus 200 without passing through the keyboard driver 104 in the control PC 100. It is therefore possible to send the special key such as Ctrl-Alt-Delete key, so the key operation onto the server can be performed from the keyboard of the control PC 100.

A detailed description is omitted on the configuration of the transmitting and receiving the video signal. However, the operation will be described briefly below. The KVM apparatus 200 receives the video signal from the server N, performs analog-digital conversion of the video signal, converts into packets, and transmits to the control PC 100. The control PC 100 receives the packet data from the KVM apparatus 200, acquires the video signal of the packet data, and displays on the operation window. In this manner, it is possible to display the pointing device operation and the key input of the remote server N.

Figure 9:
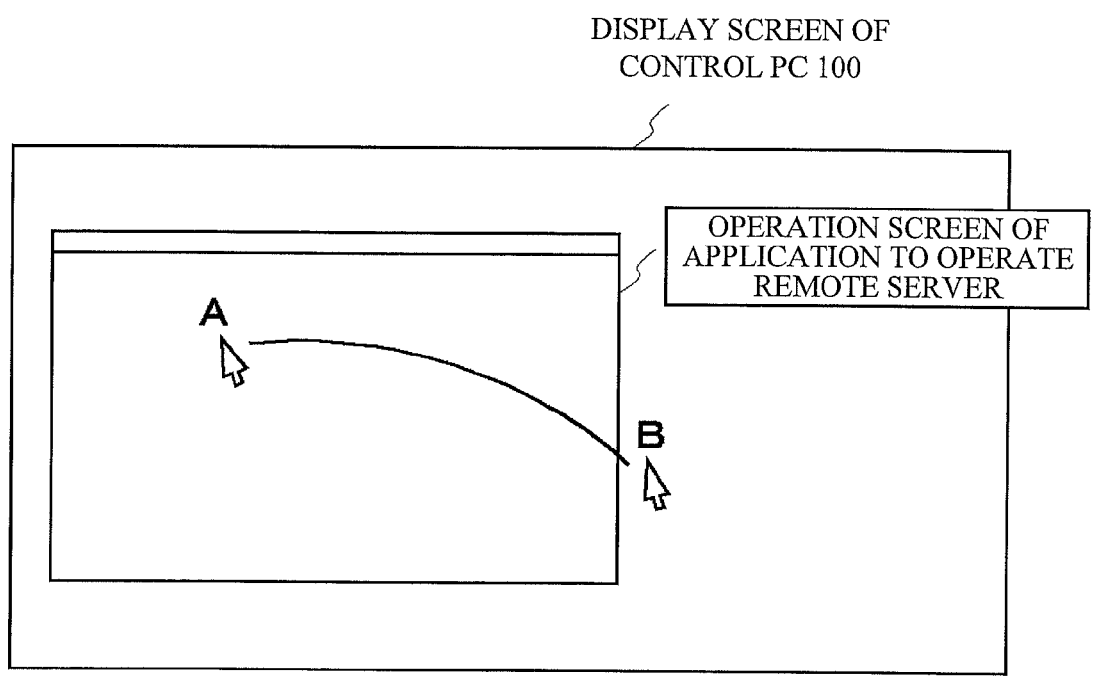
FIG. 9 shows a screen provided by an application.

In the above-described exemplary embodiment, the instruction data is selectively changed according to whether or not the application that operates the remote server N is activated. In addition, in a case where there is a cursor of the pointing device 111 such as a mouse or the like in the area of the operation screen activated by the application as shown in FIG. 9, the scan data is output to the data converter 105 to change to the path where there is no conversion. In a case where there is no cursor of the pointing device 111 in the area of the operation screen, it may be changed to the path where the scan data is converted into the key code by the keyboard driver 104.

For the above-described determination, the OS 102 is registered to receive the event generating at the pointing device 111. The event generating in a state where the cursor of the pointing device 111 exists on the operation screen is notified to the data detection module 101 from the OS 102, so that the data detection module 101 acquires the event.

As indicated by a cursor position A, in a case where there is a cursor on the operation screen of the application, the OS 102 notifies to the data detection module 101. Such notified data detection module 101 sets the instruction data "1" on the memory 106. This procedure is described above. Meanwhile, in a case where the cursor moves out of the operation screen of the application such as a cursor position B, the notification from the OS 102 cannot be acquired by the detection module 101 and the data detection module 101 sets the instruction data "0". In this manner, the transmission path of the scan code can be selectively changed according to the cursor position of the pointing device.

When a selector button is displayed on the operation screen provided by the application and the selector button is pushed by the pointing device 111, it may be configured such that the data detection module 101 sets the instruction data "1".

Second Exemplary Embodiment

Figure 10:
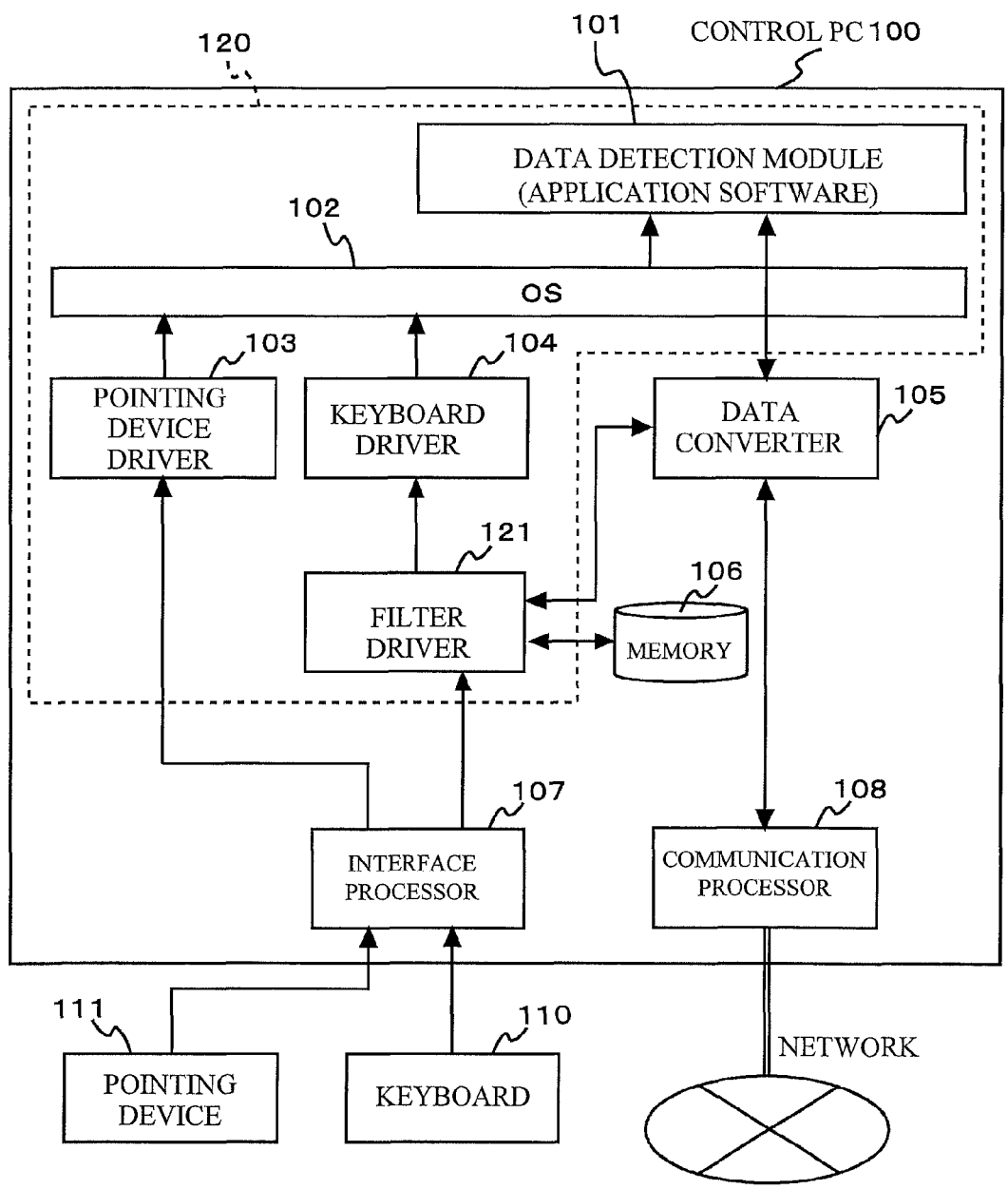
FIG. 10 shows a configuration of the control PC in accordance with a second exemplary embodiment of the present invention.

A description will now be given of a second exemplary embodiment with reference to the accompanying drawings. FIG. 10 shows a configuration of the control PC 100 in accordance with the second exemplary embodiment of the present invention. In the first exemplary embodiment, when the scan code is input from the keyboard 110, the interface processor 107 selectively changes the output destination where the scan code is to be output. That is to say, the interface processor 107 is provided to have the functions of changing the output destination where the scan code is to be output. Meanwhile, in the present exemplary embodiment, the filter driver (changing portion) 121 is installed to selectively change the output destination where the scan code is to be output by means of software control. The driver software such as the keyboard driver 104 or the like has a layered structure with multiple programs, not a single program. Instructions and data are passed onto a higher level or lower level and processed. The operation of the layered drivers can be partially changed by adding and inserting the filter driver to the existing driver.

The filter driver 121 acquires the instruction data output from the data detection module 101 via the data converter 105, and stores the instruction data in the memory 106. When the scan code is input from the interface processor 107, the filter driver 121 outputs the scan code to a given output destination where the scan code is to be output, according to the instruction data stored in the memory 106. That is to say, if the instruction data is "0", the scan code is output to the keyboard driver 104. If the instruction data is "1", the scan code is output to the data converter 105.

In the present exemplary embodiment, the scan code can be transmitted to the KVM apparatus 200 without converting the scan code into the key code, by adding the filter driver 121 to the control PC 100.

Third Exemplary Embodiment

A description will be given of a third exemplary embodiment with reference to the accompanying drawings. There are multiple types of the scan codes generated by the input on the keyboard 110, such as scan code sets 1 through 3 of PS/2 keyboard, the scan code of the USB keyboard, and the like. Among the afore-mentioned scan codes, the scan code set to be used varies depending on the connection state of the server to be used, BIOS, and the driver software.

In a case where there is an input on the USB keyboard on the control PC 100 side, the USB scan code is transmitted to the KVM apparatus 200. At this time, the server N and the KVM apparatus 200 are connected by PS/2, and the server N operates with the scan code set 1 of PS/2 keyboard. Even if the KVM apparatus 200 transmits the USB scan code to the server N in this state, the input on the keyboard 110 is not recognized by the server N and the operation cannot be performed. Accordingly, the scan code suitable for the server N has to be transmitted to the KVM apparatus 200.

Figures 11, 12:
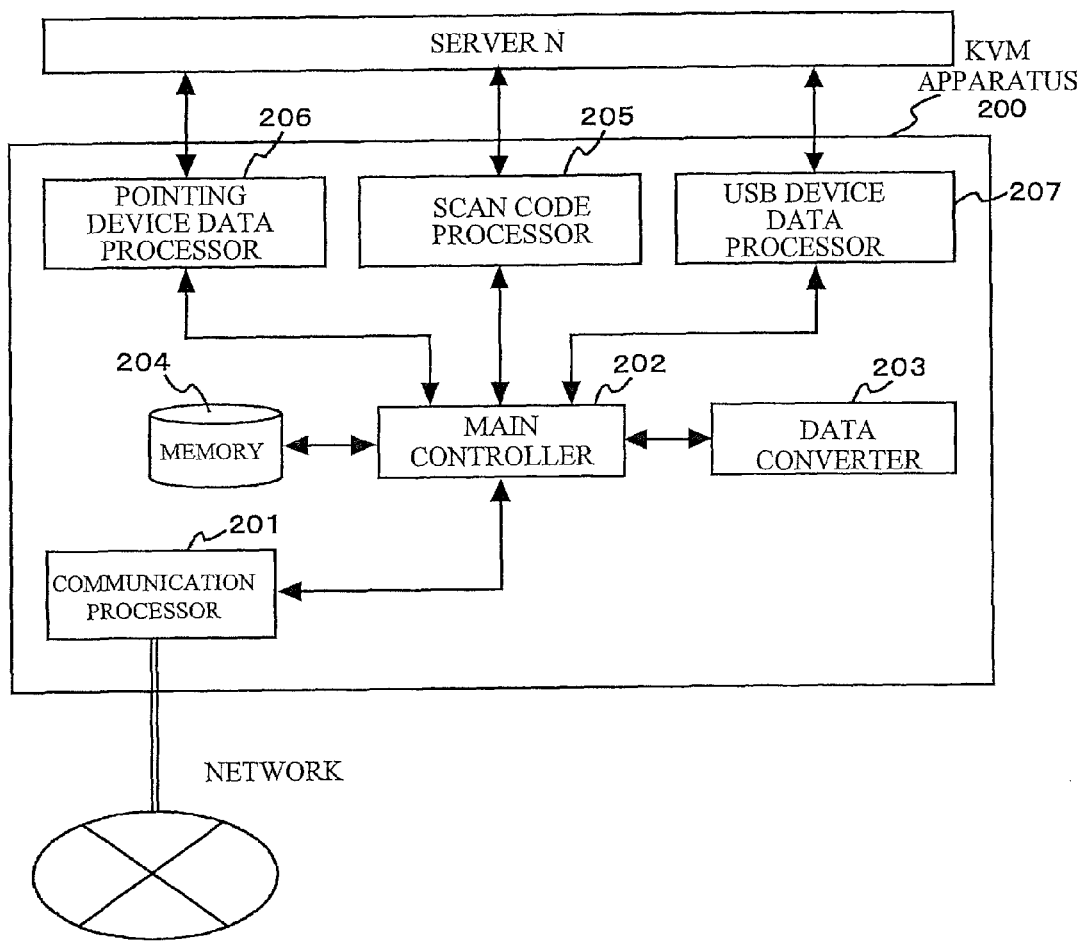
FIG. 11 shows a configuration of the KVM apparatus in accordance with a third exemplary embodiment of the present invention.
FIG. 12 shows a packet format.

FIG. 11 shows a configuration of the KVM apparatus 200. A USB device data processor 207 is newly provided with the KVM apparatus 200, as shown in FIG. 11. The USB device data processor 207 transmits the USB scan code output from the main controller 202 to the server N. When the enumeration starts with the server N by means of USB connection, the USB device data processor 207 receives the enumeration data transmitted from the server N, and outputs to the main controller 202.

When the server N and the KVM apparatus 200 are connected by PS/2, the KVM apparatus 200 receives the negotiation data transmitted from the server N on the scan code processor 205 at the time of negotiation of PS/2 connection. The negotiation data is transmitted to the main controller 202. The main controller 202 retrieves any of the PS/2 scan code sets 1 through 3 included in the negotiation data, and stores in the memory 204 as the scan code set information (connection specification information).

When the server N and the KVM apparatus 200 are connected by USB, the KVM apparatus 200 receives the enumeration data transmitted from the server N at the time of enumeration of USB connection, at the USB device data processor 207. The enumeration data is transmitted to the main controller 202. The main controller 202 retrieves the USB scan code included in the enumeration data, and stores in the memory 204 as the scan code set information.

The data converter (data converting portion) 203 refers to the scan code set information stored in the memory 204, and converts the scan code acquired from the control PC 100 into the data of a format represented by the scan code set information stored in the memory 204. That is to say, the scan code is converted into the scan code that corresponds to the connection specification between the KVM apparatus 200 and the server N. Such converted PS/2 scan code is output to the scan code processor 205 by the main controller 202. Such converted USB scan code is output to the USB device data processor 207 by the main controller 202.

FIG. 12 is an example of a format of the packet data transmitted and received between the control PC 100 and the KVM apparatus 200. The data portion of the packet data includes: identification data; data ID; data length; and actual data, as shown in FIG. 12. The identification data is arbitrary data representing that the data is transmitted by the process of the present system. When the packet data that does not have the identification data is received by the KVM apparatus 200, the KVM apparatus 200 determines that the data has been transmitted from the control PC 100 in an existing method (an example of Virtual Network Computing (VNC) of RealVNC).

The data ID represents the data type transmitted to the KVM apparatus 200 from the control PC 100, and is defined as follows:
0x01: PS/2 scan code set 1
0x02: PS/2 scan code set 2
0x04: PS/2 scan code set 3
0x08: USB scan code
0x10: PS/2 pointing device data
0x20: USB pointing device data
0x40: command The data length represents the byte number of the actual data. The actual data is the data of the keyboard and the pointing device from the control PC 100. That is to say, this actual data includes the scan code. In addition, if the data ID is the actual data representing a command, the following data is included.

(1) change instruction of the scan code set
(2) scan code set information (data stored in the memory of the KVM apparatus)
(3) transmission request of the scan code set information It is assumed that the data ID represents a command (in other words, 0x40 is input) and the actual data is the data of (1) and (2). In this case, when the KVM apparatus 200 receives the packet data, the main controller 202 checks the data ID and the actual data, and changes the scan code set information stored in the memory 204. It is assumed that the data ID represents a command and the actual data is the data of (3). In this case, the data is the transmission request of the scan code set information stored in the memory 204 of the KVM apparatus 200. Further, if the data ID of the packet data transmitted to the control PC 100 from the KVM apparatus 200 represents a command and the actual data is the data of the above-described (2), the control PC 100 is capable of acquiring the scan code set information of the server N.

Figure 13:
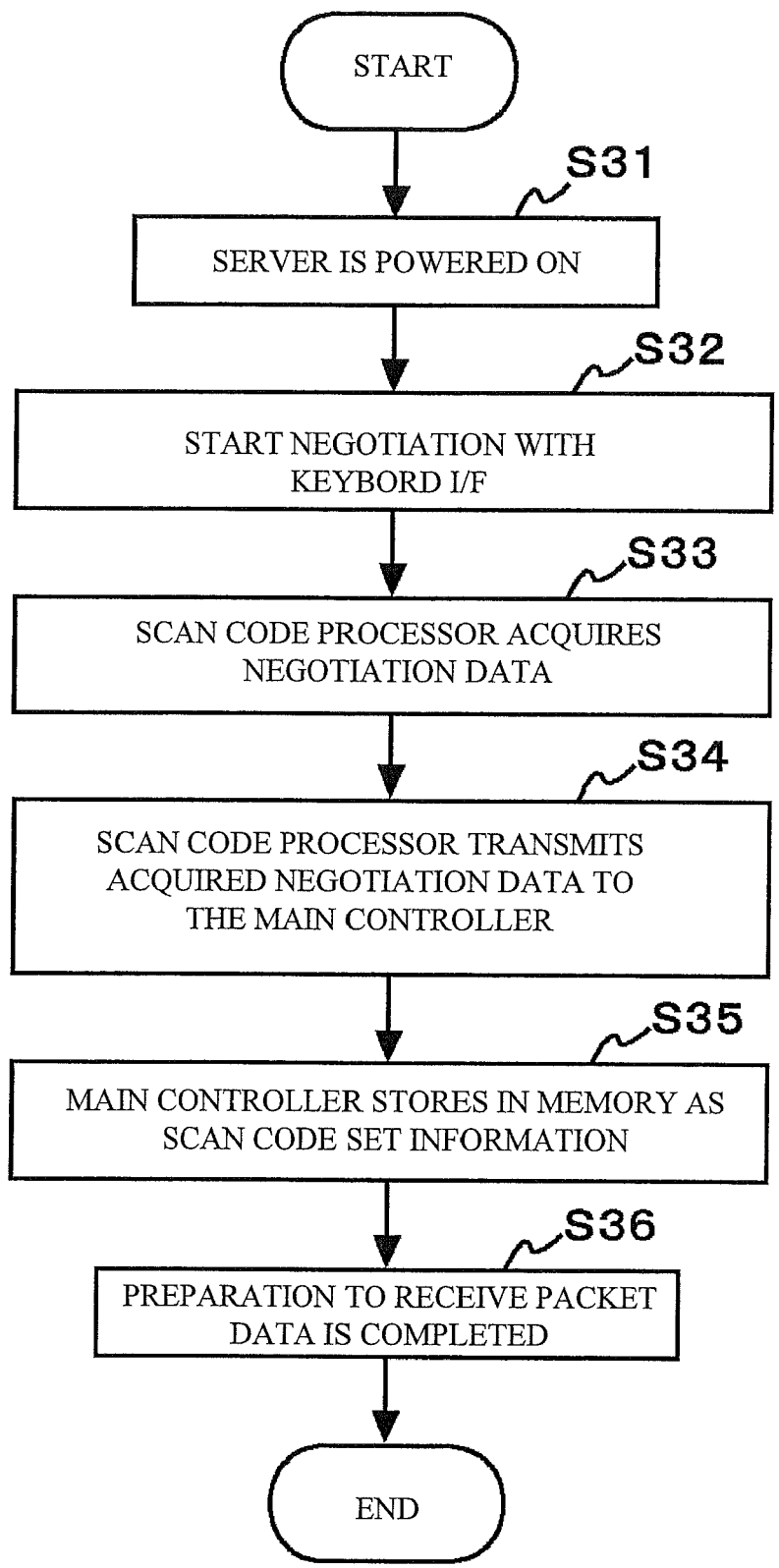
FIG. 13 shows a flowchart of operation at the time of powering on a server N in connection with the KVM apparatus through PS/2.

Next, a description will be given of the operation when the server N, which is connected with the KVM apparatus 200 by PS/2, is powered on, with reference to FIG. 13. When the server N is powered on (step S31), the negotiation (initial setting) of the PS/2 keyboard interface starts (step S32). The scan code processor 205 acquires the negotiation data from the server N (step S33), and outputs to the main controller 202 (step S34). The main controller 202 retrieves any of the PS/2 scan code sets 1 through 3 from such received negotiation data, and stores in the memory 204 as the scan code set (step S35). In this state, the preparation to receive the packet data from the control PC 100 is completed (step S36).

Figure 14:
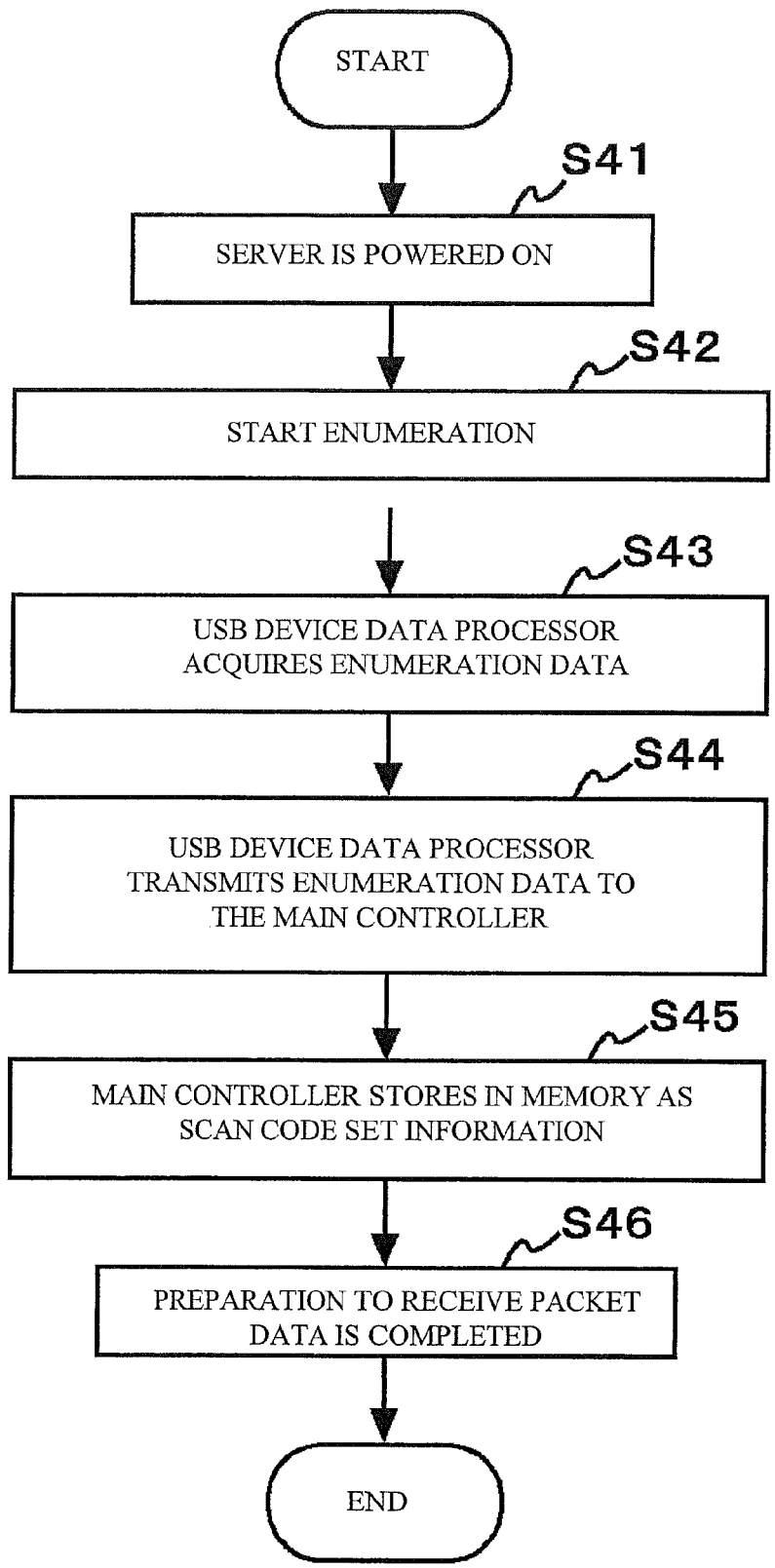
FIG. 14 shows a flowchart of operation at the time of powering on a server N in connection with the KVM apparatus through USB.

Next, a description will be given of the operation when the server is powered on in connection with the KVM apparatus 200 by a USE device, with reference to FIG. 14. When the server N is powered on (step S41), the enumeration of the USB keyboard interface starts (step S42). Enumeration is to acquire the information from the device so that the host learns what device is in connection with a bus and the device is configured on the basis of the acquired information. In other words, the enumeration is a process to recognize the connection of the USB device. The USB device data processor 207 acquires the enumeration data from the server N (step S43), and transmits the acquired enumeration data to the main controller 202 (step S44). The main controller 202 stores the USB scan code from the acquired enumeration data in the memory 204 as the scan code set information (step S45). In this state, the KVM apparatus 200 completes the preparation to receive the packet data from the control PC (step S46).

Also, it can be considered that the server N and the KVM apparatus 200 are connected by both PS/2 and USB. In such a case, it is possible to give priority to any one of them, for example, the USB connection. Accordingly, the scan code set information stores the USB scan code. In addition, the priority of the PS/2 and USB can be changed by transmitting the command from the control PC 100. As an example of the change, it is possible to change with the use of a hot key input on the keyboard of the control PC or the GUI button displayed by the application software.

Figure 15:
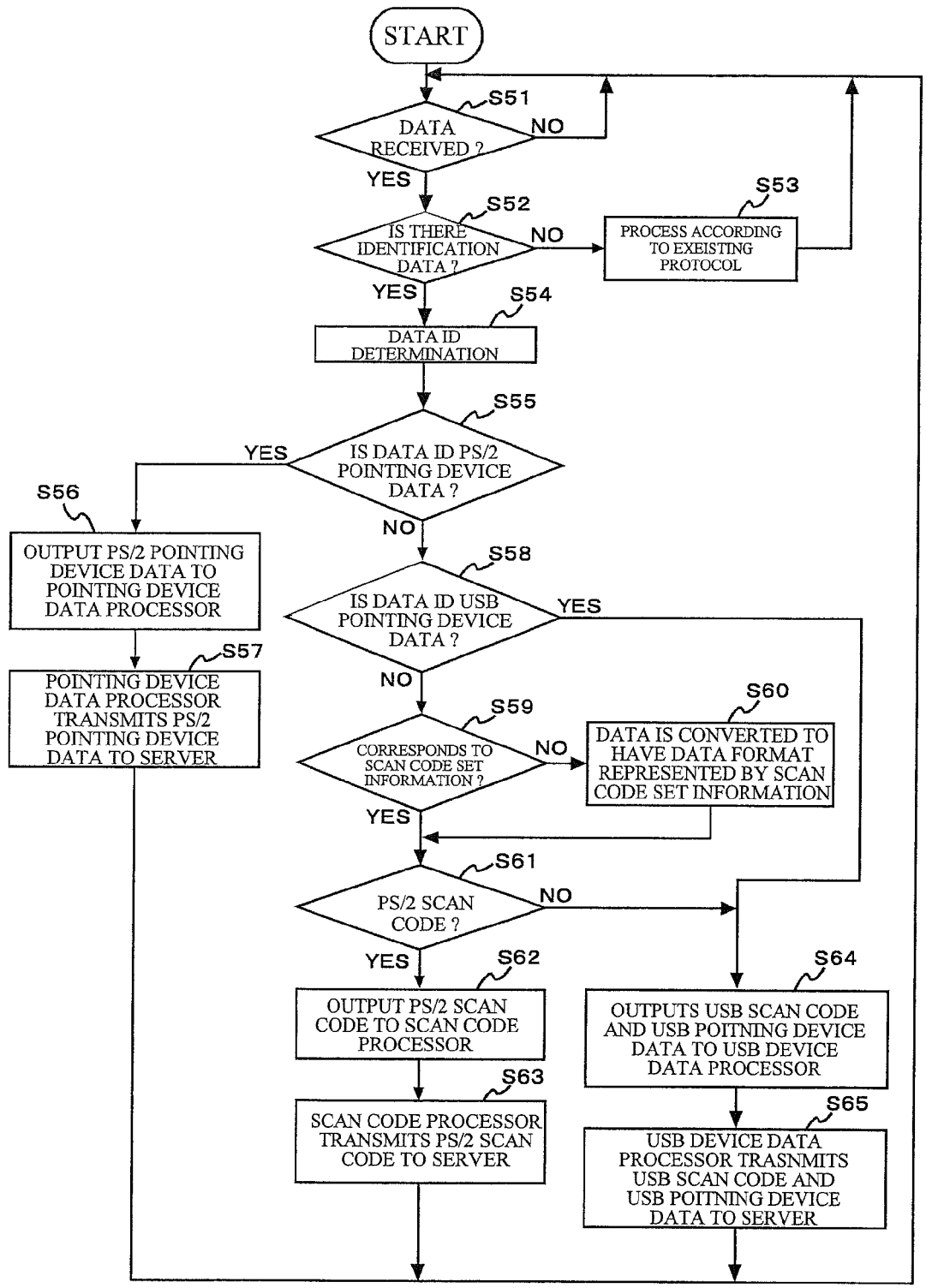
FIG. 15 shows a flowchart of determination process of the KVM apparatus that receives the packet data.

A description will now be given of the data processing of the KVM apparatus 200, with reference to a flowchart shown in FIG. 15. Upon receiving the packet data from the communication processor 201 (step S51/YES), the main controller 202 of the KVM apparatus 200 retrieves the data portion shown in FIG. 12 from the packet data and confirms whether or not there is the identification data (step S52). If there is the identification data (step S52/YES), the data ID is confirmed (step S54). If there is no identification data (step S52/NO), the data is determined not to be the data transmitted from the control PC 100 in the present system, performs the process according to the existing protocol (an example is VNC) (step S53), and transmits the data to the keyboard and pointing device data to the server N.

Next, the main controller 202 determines the data ID included in the packet data (step S54). If the scan code set information written in the packet data is the PS/2 pointing device data (step S55/YES), the main controller 202 transmits the pointing device data retrieved from the data portion to the pointing device data processor 206 (step S56). The pointing device data processor 206 transmits the PS/2 pointing device data to the server N (step S57).

If the data ID is that of the USB pointing device data (step S58/YES), the main controller 202 transmits the USB pointing device data retrieved from the data portion to the USB device data processor 207 (step S64). The USB device data processor 207 transmits the received USB pointing device data to the server N (step S65).

If the data ID retrieved from the packet data does not represent the PS/2 pointing device data (step S55/NO) or the USB pointing device data (step S58/NO), the main controller 202 determines whether or not the data ID corresponds to the scan code set information (step S59). The scan code set information stored in the memory 204 is the scan code set information that corresponds to the connection of the KVM apparatus 200 and the server N. If the data ID does not correspond to the scan code set information stored, the scan code transmitted to the server N without change is not recognized on the server N. Accordingly, if the data ID does not correspond to the scan codes set information (step S59/NO), the data is converted to have a corresponding data format on the data converter 203. The data conversion on the data converter 203 is performed according to a conversion table stored in the memory (ROM). The ROM stores the conversion table for each piece of all scan code set information (scan code sets 1 through 3 and USB scan code set). The data converter 203 converts the scan code retrieved from the packet into the data format represented by the scan code set information registered in the memory 204 (step S60).

If the data ID corresponds to the scan code set information (step S59/YES) or the data conversion is completed (step S60), the scan code is output to the corresponding transmitting portion. If the scan code is a PS/2 scan code (step S61/YES), the main controller 202 outputs the PS/2 scan code to the scan code processor 205 (step S62). The scan code processor 205 transmits the received PS/2 scan code to the server N. If the scan code is a USB scan code (step S61/NO), the main controller 202 outputs the USB scan code to the USB device data processor 207. The USB device data processor 207 transmits the received USE scan code to the server N (step S65).

In the present exemplary embodiment, even if the keyboard input has any format of the control PC 100, it is possible to convert into an appropriate scan code and transmit to the server N.

In the above-described exemplary embodiment, the data is converted on the KVM apparatus 200 and transmitted to the server N. In addition, as another exemplary embodiment, the control PC 100 may acquire the scan code set information and transmit the scan code in which the data is converted on the control PC 100. In this case, the scan code set information acquisition command is defined between the control PC 100 and the KVM apparatus 200, so that the control PC 100 can acquire the scan code set information.

Fourth Exemplary Embodiment

A fourth exemplary embodiment will be described with reference to the accompanying drawings. In the present exemplary embodiment, the scan code is encrypted and transmitted to the KVM apparatus 200 via the network. The KVM apparatus 200 decrypts the received scan code and transmits to the server N.

Figure 16:
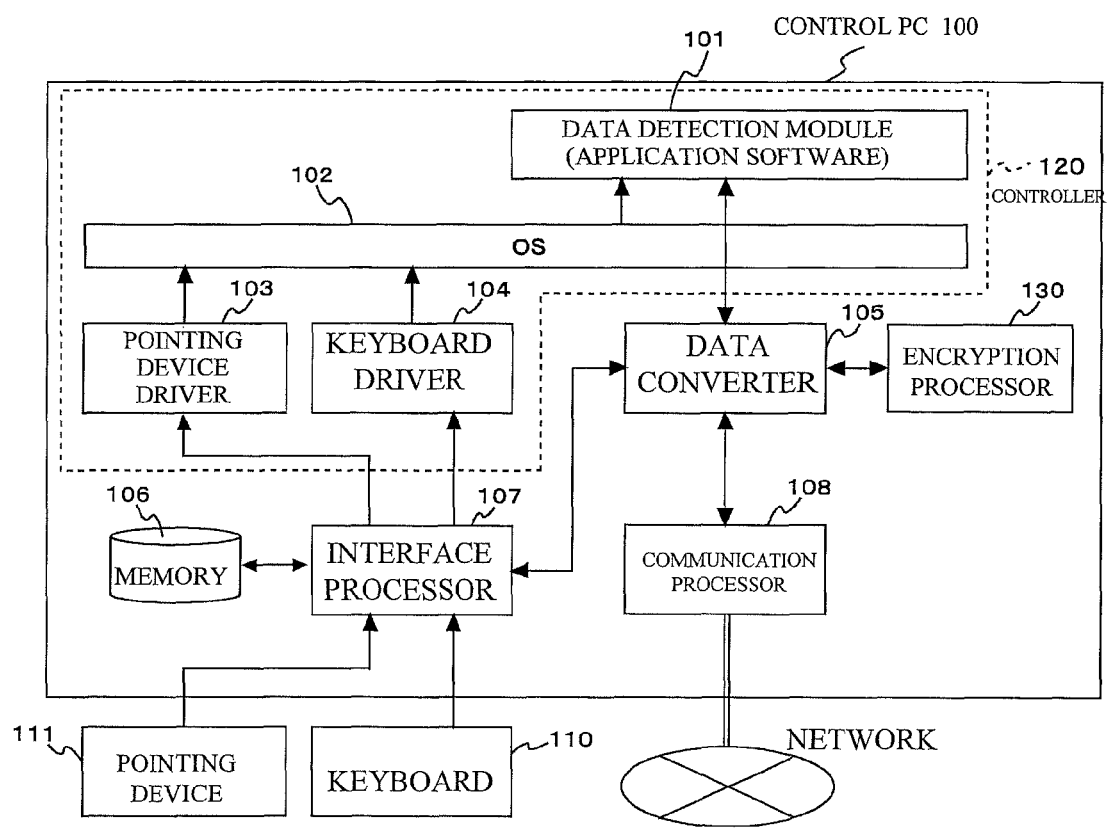
FIG. 16 shows a configuration of the control PC in accordance with a fourth exemplary embodiment of the present invention.
Figure 17:
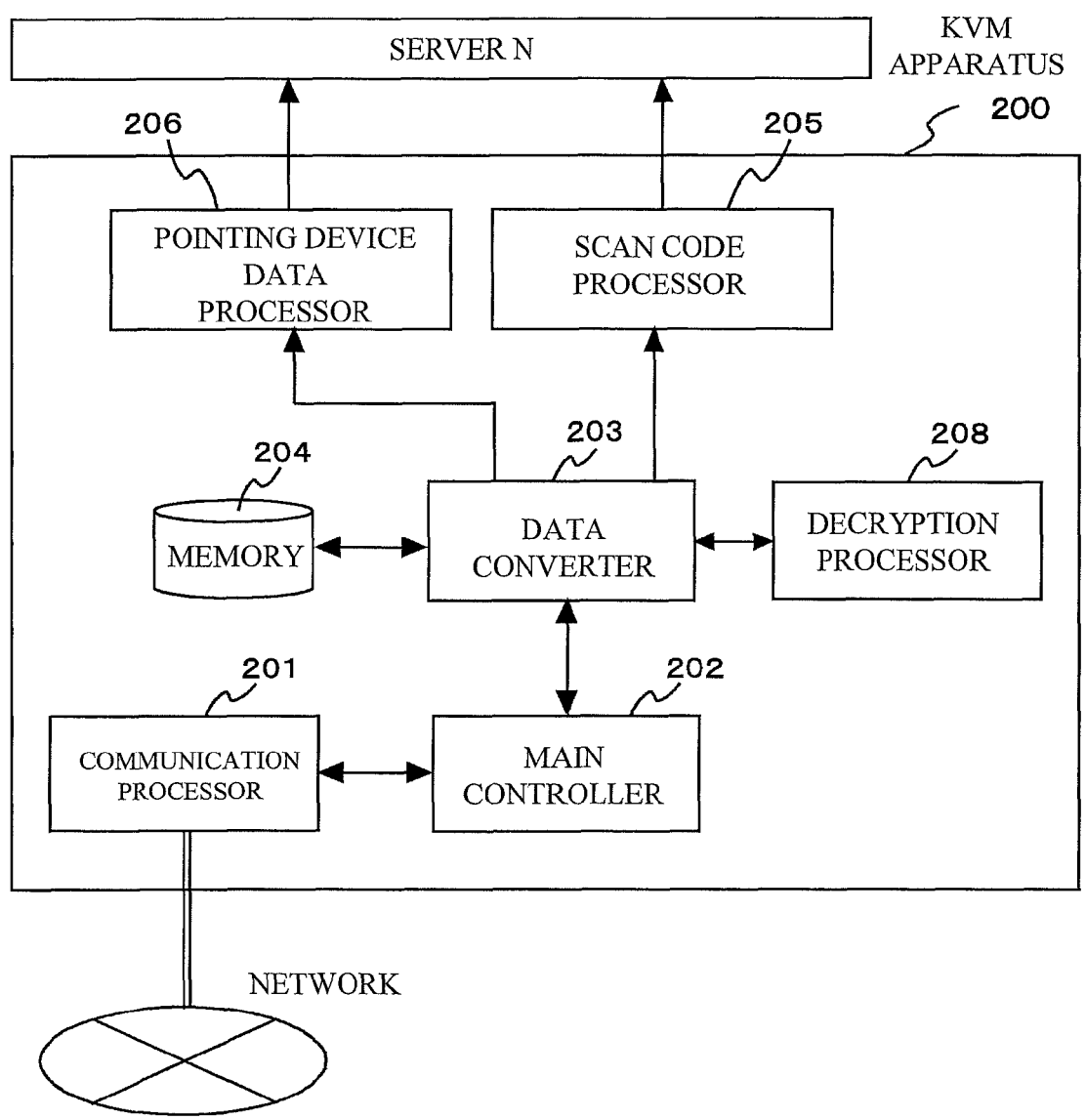
FIG. 17 shows a configuration of the KVM apparatus in accordance with the fourth exemplary embodiment of the present invention.

FIG. 16 shows a configuration of the control PC 100. FIG. 17 shows a configuration of the KVM apparatus 200. As shown in FIG. 16, the control PC 100 is additionally provided with an encryption processor 130, and the KVM apparatus 200 is additionally provided with a decryption processor 208.

The encryption processor 130 encrypts data transmitted from the data converter 105, and such encrypted data is transmitted to the data converter 105. The data converter 105 converts the encrypted scan code into packets, and outputs the packet to the communication processor 108. The communication processor 108 transmits the packet data to the KVM apparatus 200.

The KVM apparatus 200 receives the packet data transmitted through the network at the communication processor 201, and transfers to the data converter 203. The data converter 203 retrieves the encrypted scan code from the packet data. Such retrieved scan code is output to the decryption processor 208 and decrypted therein. Such decrypted scan code is returned from the decryption processor 208 to the data converter 203, and is output to the scan code processor 205 from the data converter 203. The scan code processor 205 outputs the scan code to the server N.

In the present exemplary embodiment, it is possible to encrypt the keyboard data to output to the network, and it is also possible to decrypt the encrypted keyboard data to transmit to the server N. Accordingly, the information leakage can be prevented, thereby enhancing the security.

A scan code transmission method employed as an aspect of the present invention is realized with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The present invention is not limited to the above-mentioned exemplary embodiments, and other embodiments, variations and modifications may be made without departing from the scope of the present invention. For example, the data detection module 101 may be configured as hardware, and the data converter 105 may be configured by software.

The present invention is based on Japanese Patent Application No. 2005-235216 filed on Aug. 15, 2005, the entire disclosure of which is hereby incorporated by reference.

What is claimed is:

1. A server selector comprising:
a storage portion that stores information on a connection specification between one or more server apparatuses and the server selector;

a data converting portion that converts a scan code generated from a keyboard into data corresponding to the connection specification; and a transmitting portion that transmits the data corresponding to the connection specification, to the one or more server apparatuses, wherein the server selector can operate the one or more server apparatuses by setting a console, and wherein when one of the one or more server apparatuses is powered on, the server selector acquires enumeration data from the server apparatus during a process of a connection recognition between the server apparatus and a USB device, retrieves information of the connection specification from the enumeration data acquired, and stores the information in the storage portion.

2. The server selector comprising as claimed in claim 1, wherein the scan code data is transmitted to the server apparatuses in a form that does not require changing the scan code data.

3. A server selector comprising:

a storage portion that stores information on a connection specification between one or more server apparatuses and the server selector;

a data converting portion that converts a scan code generated from a keyboard into data corresponding to the connection specification; and a transmitting portion that transmits the data corresponding to the connection specification, to the one or more server apparatuses, wherein the server selector can operate the one or more server apparatuses by setting a console, and wherein when one of the one or more server apparatuses is powered on, the server selector acquires negotiation data from the server apparatus at a connection establishment with the server apparatus, retrieves the information on the connection specification from the negotiation data acquired, and stores the information in the storage portion.

4. The server selector comprising as claimed in claim 3, wherein the scan code data is transmitted to the server apparatuses in a form that does not require changing the scan code data.

* * * * *